United States Patent [19]

Redeker

[11] Patent Number: 5,758,869

[45] Date of Patent: Jun. 2, 1998

[54] WORK SUPPORT FOR FLAT WORKPIECE MACHINING APPARATUS

[75] Inventor: Günter Redeker, Stemmwede/Levern, Germany

[73] Assignee: IMA Norte Maschinenfabriken Klessmann GmbH, Gutersloh, Germany

[21] Appl. No.: 687,359

[22] PCT Filed: Feb. 22, 1995

[86] PCT No.: PCT/EP95/00635

§ 371 Date: Aug. 1, 1996

§ 102(e) Date: Aug. 1, 1996

[87] PCT Pub. No.: WO95/23047

PCT Pub. Date: Aug. 31, 1995

[30] Foreign Application Priority Data

Feb. 26, 1994 [DE] Germany ............... 94 03 242 U

[51] Int. Cl.$^6$ .............................................. B25B 11/00
[52] U.S. Cl. .............................. 269/21; 269/296; 269/307; 269/329
[58] Field of Search .................. 269/1, 11, 21, 269/296, 329, 297, 298, 299, 300, 301, 307; 116/202, 209, 230, 231, 281, 283, 321; 362/33, 97; 33/568, 573, 706

[56] References Cited

U.S. PATENT DOCUMENTS

| 2,676,409 | 4/1954 | Gamble | 362/97 |
| 4,256,296 | 3/1981 | Scheinert | 269/297 |
| 5,042,772 | 8/1991 | Madjeski | 269/21 |

FOREIGN PATENT DOCUMENTS

| 4203808 | 8/1993 | Germany | 269/21 |
| 402257010 | 10/1990 | Japan | 33/706 |
| 1427177 | 9/1988 | U.S.S.R. | 33/706 |

*Primary Examiner*—Robert C. Watson
*Attorney, Agent, or Firm*—Charles E. Baxley, Esq.

[57] ABSTRACT

A support for flat workpieces for program-controlled machines includes a plurality of workrest rails which are movable along a first machining axis. Each workrest rail supports a plurality of vacuum chucks which are movable along the workrest rails and thereby movable along a second machining axis. Light bands which include a row of point sources of light are provided to indicate the selected positions of the workrest rails and the selected positions of the vacuum chucks on the workrest rails, thereby ensuring that the machining process does not interfere with or damage the vacuum chucks.

12 Claims, 2 Drawing Sheets

WORK SUPPORT FOR FLAT WORKPIECE MACHINING APPARATUS

BACKGROUND OF THE INVENTION

This present invention relates generally to the field of workrests for program-controlled machines which are used for the machining of flat workpieces made of wood or wood substitutes.

Program-controlled machines for the machining of flat workpieces typically include workrest rails which can be displaced manually in a direction transverse to their longitudinal axes in a direction which coincides with one of the machining axes of the machine, such as the X axis. The workrest rails typically have vacuum chucks which can be manually positioned along the logitudinal axes of the workrest rails in a direction which coincides with a second machining axis of the machine, such as the Y axis.

The positioning of the vacuum chucks depends on the configuration of the flat workpieces in order to ensure that the vacuum chucks, which protrude upward on the workrest rails, are not damaged during the machining operations which are performed by rotating machine tools along the peripheral edges of the workpieces. The workrest rails and the vacuum chucks must therefore be arranged so that the edges of the workpieces protrude beyond the vacuum chucks so that the tools can travel along these edges during the machining operations. The vacuum chucks must also be positioned to allow drilling operations which involve emergence of the tool on the bottom of the workpiece.

The positioning of workrest rails and vacuum chucks is typically performed by hand and, typically, special instructions are required as to the placement of the workpiece rails and the vacuum chucks according to the desired configuration of the workpieces. Despite these special instructions, errors are constantly being made and, as a rule, at least one of the vacuum chucks is struck by a machining tool and damaged.

OBJECT AND SUMMARY OF THE INVENTION

It is an object of the present invention to provide a workrest in which the coordinates for the positioning of the workpiece rails and the vacuum chucks are established by optical aids.

The foregoing and other objects and advantages of the present invention will appear more fully hereinafter.

In accordance with the present invention, there is provided a workrest for flat workpieces, which are machined on program-controlled machines, which includes a plurality of elongated workrest rails, which are guided for motion along a first machining axis by a guide member. Each workrest rail supports a plurality of movable vacuum chucks. The vacuum chucks can be moved along the workrest rails to selected positions which depend on the size and configuration of the workpieces to be machined. The workrest rails are disposed parallel to a second machining axis which is perpendicular to the first machining axis.

The workrest also provides a light band on the workrest rail guide member and on each of the workrest rails. The light bands include an array of point sources of light which are selectively illuminated to indicate the selected positions of the workrest rails and the selected positions of the vacuum chucks on the workrest rails, thereby ensuring that the machining process does not interfere with or damage the vacuum chucks.

Vacuum chucks are provided which are square in configuration and rectangular in configuration. The intensity of illumination of the illuminated areas of the light bands may be varied to provide areas of greater and lesser intensity thereby indicating the spacing of a rectangular vacuum chuck either proximate to or spaced away from the highest of the workrest rails.

BRIEF DESCRIPTION OF THE DRAWINGS

Other important objects and advantages of the invention will be apparent from the following detailed description, taken in conjunction with accompanying drawings in which.

DETAILED DESCRIPTION OF THE INVENTION

Figure 1:
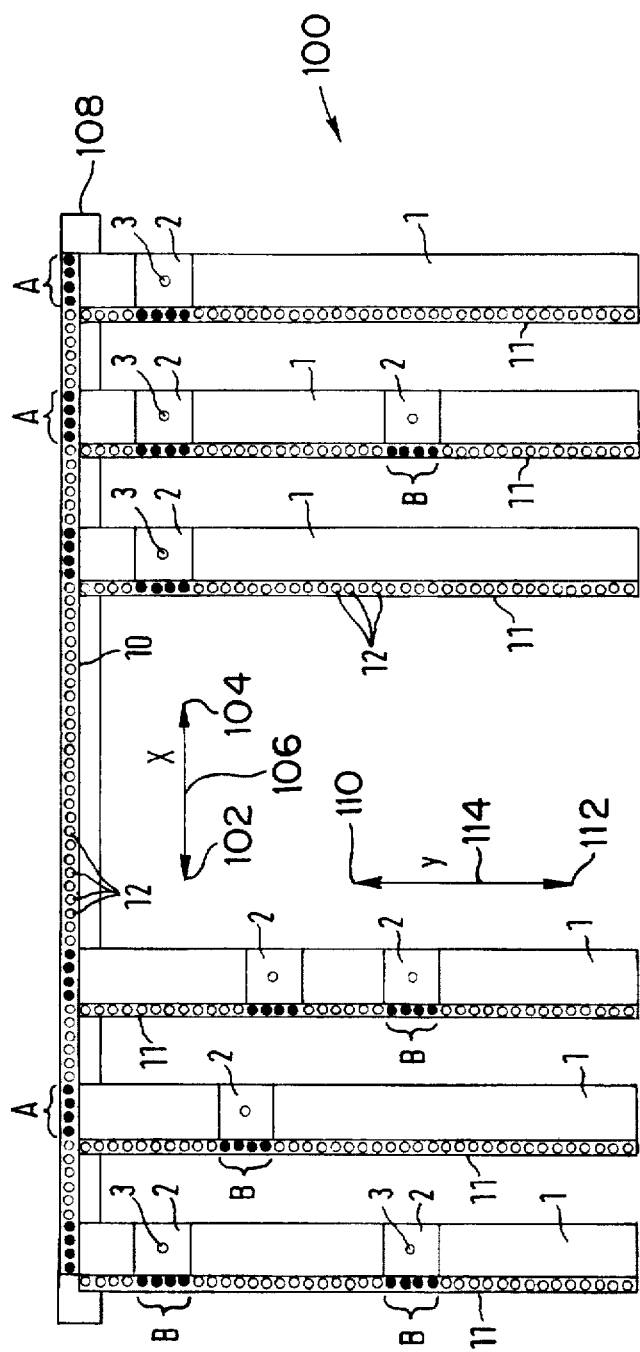
FIG. 1 is a diagrammatic top view of a workrest, made in accordance with the present invention, showing a plurality of workrest rails.

With reference to the drawings, wherein like reference numbers designate like or corresponding parts throughout, there is shown in FIG. 1, a workrest 100 for the machining of flat workpieces, made in accordance with the present invention. The workrest 100 is used with a program-controlled machine which operates along an X axis and a Y axis, in a known manner, for the machining of flat workpieces.

The workrest 100 includes a plurality of workrest rails 1, the position of which can be individually adjusted by moving the workrest rails 1 back and forth, by hand, in the directions shown by the arrows 102, 104 in FIG. 1. As is shown in FIG. 1, the workrest rails 1 can be moved along an axis 106 which is parallel to a first machining axis, which is defined as the X axis. The workrest rails 1 are supported by a guide which is indicated schematically by the line 108.

Each of the workrest rails 1 includes a plurality of vacuum chucks 2 which can be moved in the directions shown by the arrows 110, 112 in FIG. 1 and can be placed in any desired position along the workrest rails 1. The workrest rails 1 are disposed parallel to the second machining axis 104 of the machine which is defined as the Y axis.

Figure 2:
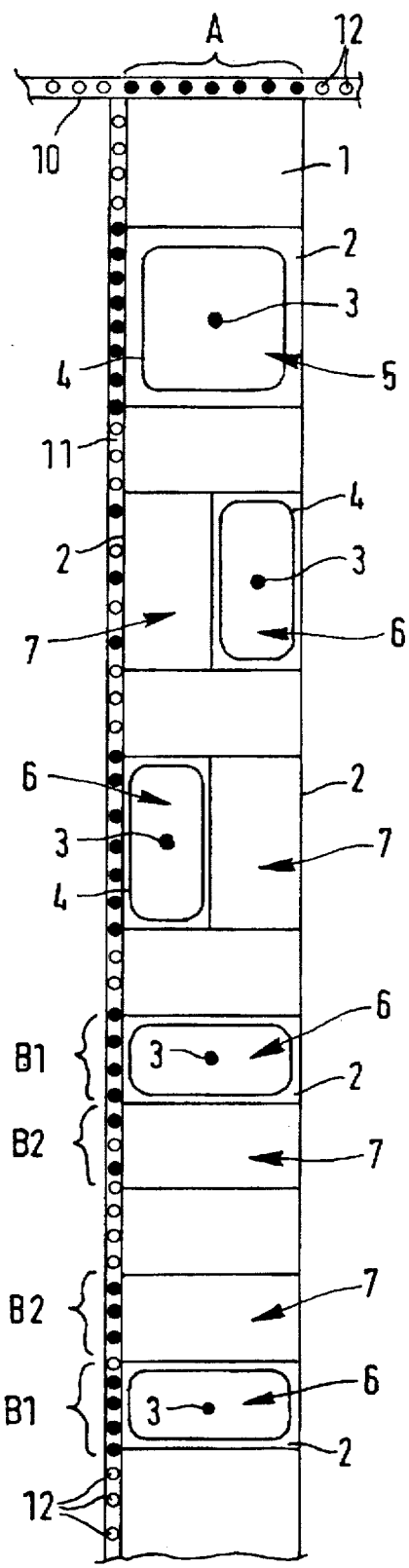
FIG. 2 is a fragmentary diagrammatic top view of one of the workrest rails of FIG. 1, with the workrest rail drawn to a larger scale.

As is shown in FIG. 2, the vacuum chucks 2 include on their top side a packing 4 which encloses or seals a vacuum field 5 which communicates with the vacuum opening 3. The vacuum chucks 2 have a basic square shape which is defined as a full field. Selected vacuum chucks 6 are provided which are generally rectangular in shape and which cover approximately one-half the area of the full vacuum chucks 2 or one-half of the basic square shape. A rectangular vacuum chuck 6 can be placed with the lengthwise direction either parallel to or transverse to the lengthwise direction of the workrest rail 1. In addition, a right-hand or a left-hand position or a front or a rear position of the rectangular vacuum chucks 6 are possible as is shown in FIG. 2. The rectangular vacuum chucks 6 are used with rectangular blank members 7 to form a generally square area which corresponds to the area of the square vacuum chucks 2.

Figure 3:
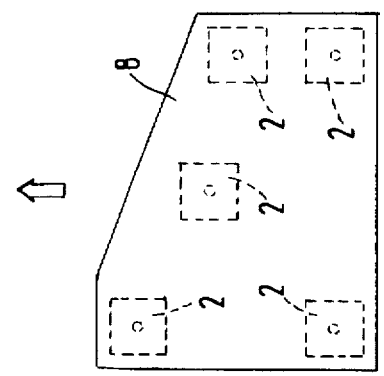
FIG. 3 is a top view of a workpiece which is held by the workrest of FIG. 1 with the vacuum chucks of the workrest of FIG. 1 shown in broken lines.
Figure 4:
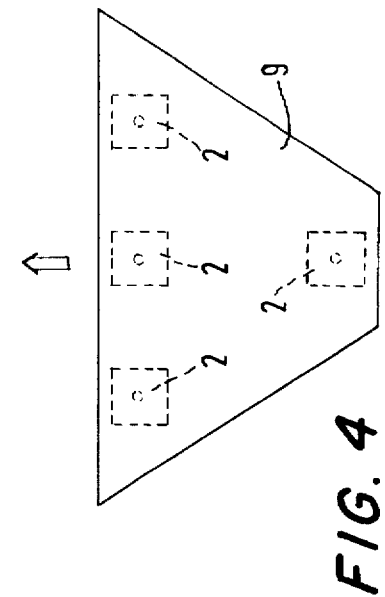
FIG. 4 is a top view of another workpiece which is held by the workrest of FIG. 1, similar to FIG. 3, showing a different configuration of the workpiece and a different arrangement of the vacuum chucks.

FIGS. 3 and 4 show two flat workpieces 8, 9 of different size and contour which may be machined using the workrest 100 of the present invention. The machining of these workpieces 8, 9 along their peripheral edges as well as the machining of various holes which it may be desired to be formed in the workpieces 8, 9 requires different positioning of the vacuum chucks 2. The positioning of the vacuum chucks 2 is indicated in broken lines in FIGS. 3 and 4.

The positioning of the vacuum chucks 2 and the alignment of the workrest rails 1 for workpiece 8 is shown by the alignment of the workrest rails 1 and the positioning of vacuum chucks 2 on the left-hand group of workrest rails 1 in FIG. 1, while the alignment of the workrest rails 1 for workpiece 9 is shown by the alignment of the workrest rails 1 and the positioning of the vacuum chucks 2 on the right-hand group of workrest rails. The setting of the workrest 100 is facilitated by a setting-up aid in the forming of an optical indicator which will be presently described.

Along the path of displacement of the workrest rails 1 in the X direction there is a first light band 10 which consists of a plurality of light-emitting diodes 12 arranged in a row one behind the other. The light band 10 extends directly along the rear ends of the workrest rails 1 which lie in a common vertical plane extending in the direction of the X-axis at the ends of the workrest rails 1 opposite from the operating side of the workrest 100. Desired positions of the vacuum chucks and the workrest rails are determined by illumination of a part of the light band means the length of which is equal to the dimensions of the workrest rails and the dimensions of the vacuum chucks. The other parts of the light band are not illuminated. The individual light-emitting diodes 12 which form light points are caused to light up at the place where the individual workrest rails 1 are to be positioned in the X direction. In corresponding manner, a section designated as "A" of these light-emitting diodes 12 of the first light band 10, which extends over the width in each case, of one of the workrest rails 1, lights up. The individual places of the sections designated "A" which are to be lit, at least temporarily, upon the adjusting of the workrest rails 1 are called up from the program control of the machine and represent the X-coordinates for the positioning of the workrest rails 1 as a function of the specific workpiece 8 or 9 to be machined.

For the positioning of the vacuum chucks 2 in the lengthwise direction of the workrest rails 1, additional light bands 11 are provided, one such light band extends along one longitudinal side of each workrest rail 1, whereby the Y-coordinate for the vacuum chucks 2 of each individual workrest rail 1 can be indicated optically. In the same way as the first light band 10, the second light band 11 is formed of a row of light-emitting diodes 12 which light up for position indication along a section designated "B" which corresponds to the width of the vacuum chucks 2 in the lengthwise direction of the workrest rail 1.

In FIG. 1, the illuminated light-emitting diodes 12 are indicated schematically by solid circles while the non-illuminated light-emitting diodes are indicated schematically by open circles.

FIG. 2 shows a variation of the optical indication for those vacuum chucks 2 which have only a half-vacuum field 6 on their top. In this case, the Y-coordinate of the position to be assumed by the half-vacuum field 6 of the vacuum chuck 2 is indicated with a higher intensity of light by a section designated "B1" on the light band 11, while for the empty field 7 alongside the half-vacuum field 6 on top of the vacuum chuck 2 a less brightly lit section designated "B2" of the light band 11 is provided, in which way, using the two lit sections "B1" and "B2" which adjoin each other, the exact desired position of the entire vacuum chuck 2 can be recognized. This is true of those vacuum chucks 2 in which the rectangular vacuum field 6 has its longitudinal axis in the transverse direction of the corresponding workrest rail 1. In similar manner, there can also be optically indicated the positioning of the half-vacuum fields 6, the vacuum chucks 2 which have the lengthwise direction of their vacuum fields 6 parallel to the lengthwise direction of the corresponding workrest rail 1. In this case, the corresponding lit sections of different light intensity are present in the first light band 10 which extends at the rear along the path of displacement of the workrest rails 1. It is obvious that the point light-emitting diodes 12 of the two light bands 10 and 11 are arranged in each case in such proximity one behind the other that a plurality of said light-emitting diodes 12 is always associated with the edge length of the square vacuum fields 5 or the edge length of the rectangular vacuum fields 6 of the vacuum chucks 2.

The different intensity of illumination for signalling the position of the half or rectangular vacuum fields 6 can be achieved by, in one case, as indicated by "B1" in FIG. 2, all of the light-emitting diodes in the array are lit while in the other case, as indicated by "B2" in FIG. 2 only every second light-emitting diode is lit.

The foregoing specific embodiments of the present invention as set forth in the specification herein are for illustrative purposes only. Various deviations and modifications may be made within the spirit and scope of the invention, without departing from the main theme thereof.

I claim:

1. A workrest for use on a program-controlled machine having a first and a second machining axis for machining of flat workpieces comprising:

guide means, said guide means disposed parallel to a first of said machining axes;

a plurality of workrest rails, said workrest rails having a longitudinal axis and a transverse axis and said workrest rails displaceable along said guide means in said direction of said transverse axis, and said workrest rails having a length dimension and a width dimension;

a plurality of vacuum chucks movably disposed on said plurality of work rest rails, said vacuum chucks having a length dimension;

first light band means disposed on said guide means in said direction of said transverse axis, said first light band means disposed to indicate a desired position of said plurality of workrest rails along said guide means;

a plurality of second light band means disposed one on each of said plurality of workrest rails, said plurality of second light band means disposed to indicate a desired position of said plurality of vacuum chucks on said workrest rails;

said first light band means organized for illuminating along a length equal to said width dimensions of said workrest rails; and said second light band means organized for illuminating along a length equal to said length dimension of said vacuum chucks.

2. A workrest according to claim 1, in which each of said light band means comprises:

a row of point sources of light.

3. A workrest according to claim 2, in which each of said point sources of light comprises a light-emitting diode.

4. A workrest according to claim 1, in which said vacuum chucks have a square configuration and in which said vacuum chucks further comprise a vacuum field generally extending over said square configuration.

5. A workrest according to claim 1, in which said vacuum chucks have a square configuration and in which selected vacuum chucks further comprise a generally rectangular vacuum field, with said rectangular vacuum field having a length dimension and a width dimension, with said length dimension of said vacuum field disposed in general alignment with said length dimension of said workrest rails.

6. A workrest according to claim 5, in which said length dimension of said vacuum chucks is disposed in general alignment with said width dimension of said workrest rails.

7. A workrest according to claim 5, in which said Light band means disposed on said workrest rails is capable of illumination along a length equal to said length dimension of said rectangular vacuum field.

8. A workrest according to claim 5, in which said light band means is capable of illumination along a length equal to said width dimension of said rectangular vacuum field.

9. A workrest according to claim 1, in which each of said light band means is capable of illumination at an increased intensity of illumination and illumination at a reduced intensity of illumination.

10. A workrest according to claim 5, in which said generally rectangular vacuum field is disposable proximate to said light band means on said workrest rails and also disposable distant from said light band on said workrest rails.

11. A workrest according to claim 10, in which the location of said rectangular vacuum field proximate to said light band means on said workrest rails is, indicated by a light band means of increased intensity of illumination and the location of said rectangular vacuum field distant from said light band means on said workrest rails is indicated by a light band means of reduced intensity of illumination.

12. A workrest according to claim 1, in said light band means is capable of illumination along a selected length, with each second point source of light illuminated, thereby providing an illuminated segment having a reduced intensity of illumination.

* * * * *